May 16, 1939. S. H. HANSEN 2,158,753
EARTHQUAKE ACTUATED SHUT-OFF VALVE
Filed April 7, 1937
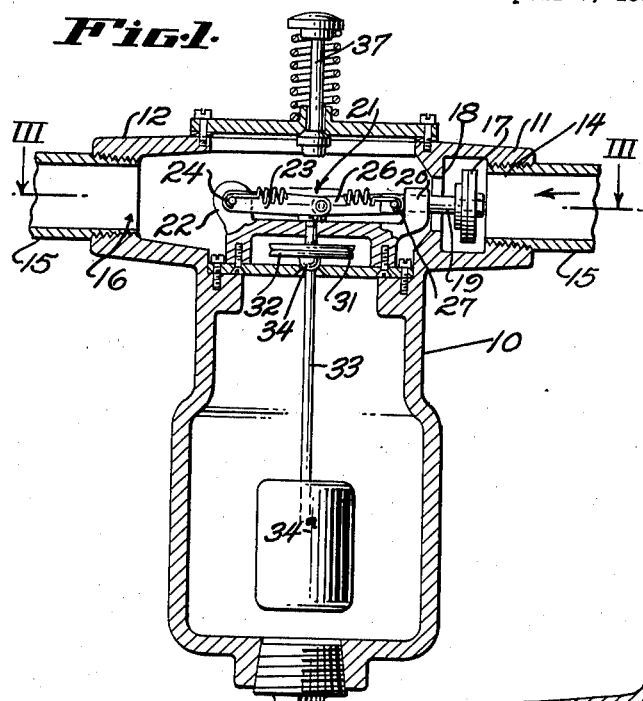
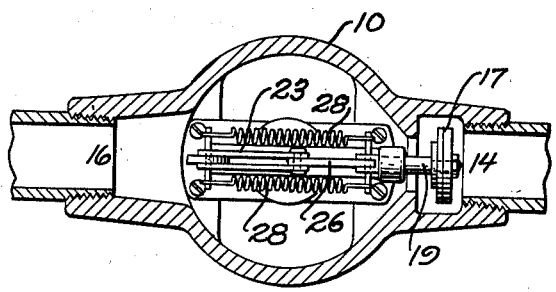
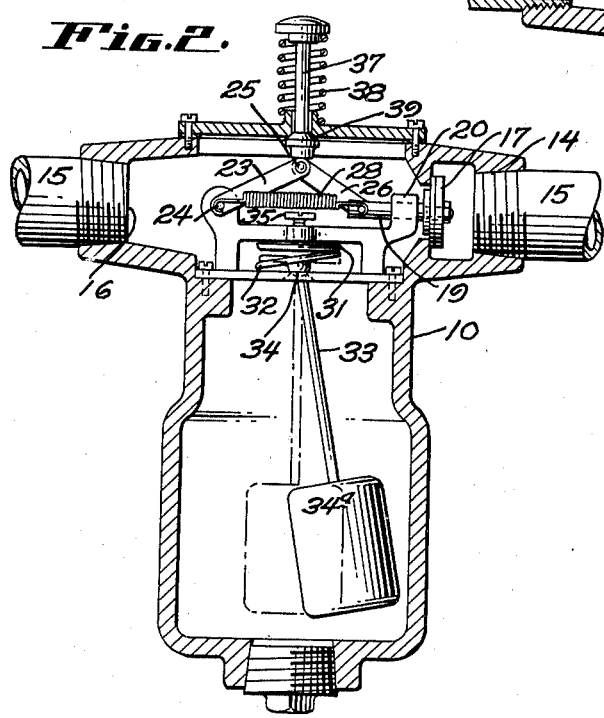
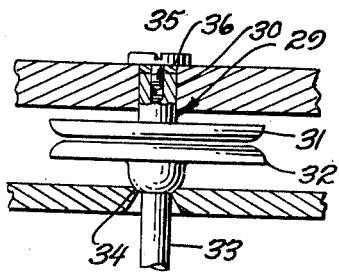
INVENTOR
SIDNEY H. HANSEN
BY
Oscar A. Mellin
ATTORNEY.

Patented May 16, 1939

2,158,753

UNITED STATES PATENT OFFICE 2,158,753

EARTHQUAKE ACTUATED SHUT-OFF VALVE

Sidney H. Hansen, Berkeley, Calif.

Application April 7, 1937, Serial No. 135,482

3 Claims. (Cl. 137—139)

This invention relates to valves operated by earthquakes or violent shocks to shut off the flow of fluid, such as inflammable gas and the like, therethrough.

In my prior United States Letters Patent No. 2,054,563, issued to me on the 15th day of September, 1936, and entitled "Earthquake actuated shut-off valve", I point out that in areas subject to earthquakes, the pipe lines conveying inflammable fluids are liable to be ruptured by the occurrence of an earthquake. Such a rupture, of course, would produce a considerable hazard of explosions and disastrous fires.

In my prior patent above referred to, I disclose an efficient valve mechanism to be associated with a pipe line and which is capable of automatically operating upon the occurrence of an earthquake or shock to close a valve in the pipe line and thereby discontinue the further passage of fluid through the line.

It is the principal object of my present invention to improve and simplify the devices of the character disclosed in my prior patent above referred to.

In practicing my invention, I provide a valve body to be interposed in a pipe line and provided with a valve member capable of shutting off the flow of fluid therethrough. A trip mechanism is provided for maintaining the valve member normally in an open position. A pendulum is provided which is capable of being actuated by an earthquake, and which is operatively associated with the trip mechanism to release the same and thereby close the valve when the pendulum is actuated by an earthquake.

One form which the invention may assume is exemplified in the following description and illustrated by way of example in the accompanying drawing, in which:

Fig. 1 is a central vertical section through a device embodying the preferred form of my invention and disclosing the valve member in open position.

Fig. 2 is a similar view but disclosing the valve in closed position after the trip mechanism has been released by swinging movement of the pendulum.

Fig. 3 is a transverse sectional view taken on line III—III of Fig. 1.

Fig. 4 is an enlarged fragmentary view partly in section to disclose the adjustment between the trip mechanism and the pendulum.

Referring more particularly to the accompanying drawing, 10 indicates a valve body having at its upper end horizontally disposed inlet and outlet connections 11 and 12 which are in axial alignment. The inlet connection 11 is provided with an inlet port 14 adapted to be connected to the pipe line 15, and the outlet connection 12 is provided with an outlet port 16 likewise to be connected to the pipe line 15. The flow of fluid through the pipe line 15 and inlet port 14 is controlled by a valve member 17 adapted to seat on a seat 18 within the inlet port.

The valve member 17 is provided with a stem 19 guided in a fixed guide 20 mounted within the valve body 10. The guide 20 guides the stem 19 so that the valve 17 may reciprocate coaxially of the inlet port 14. When the valve 17 is in open position, as disclosed in Fig. 1, the fluid in the pipe line 15 may freely flow through the valve body 10 from the inlet port 14 through the outlet port 16. When the valve 17 is in closed position, however, the flow of fluid through the body 10 is discontinued.

To maintain the valve 17 in open position, I provide a hinge connection 21 between the valve stem 19 and a lug 22 fixed to the valve body. This hinge connection 21 constitutes a trip mechanism and comprises a pair of pivotal links 23 pivoted as at 24 to the lug 22 and as at 25 to a second link 26. The second link 26 is pivoted as at 27 to the valve stem 19. The length of the links 23 and 26 is the same. When the hinge thus provided by the links 23 and 26 is in set position, as illustrated in Fig. 1, the links will be fully extended and the valve member 17 will be unseated and in open position. Tendency to move the valve toward closed position, either provided by valve closing springs 28 or pressure of the fluid against the valve, will be unavailing in that the point of connection 25 between the links 23 and 26 will be over center. However, should the point of connection 25 be moved upwardly over the line of the axis of the valve, the springs 28 and the pressure of fluid against the valve 17 will immediately cause the hinge connection to collapse and enable the valve to seat.

Thus, to trip the trip mechanism I provide a trigger 29 which comprises a stem 30 vertically reciprocable in the valve body, the upper end of which is adapted to contact the trip mechanism just below the connection 25 between the two sets of links 23 and 26. At the other end of the stem is a horizontally disposed disk 31 which is arranged contiguous to a wobble disk 32 on the upper end of a pendulum stem 33, the latter being suspended by a universal connection 34 from a fixed part of the valve body. At its lower end the pendulum stem 33 is provided with a weight 34a, this weight and the stem constituting the pendulum. This pendulum is adapted to oscillate upon the occurrence of an earthquake so as to tilt the wobble disk 32. Upon tilting of this disk 32, the disk 31 will be contacted and moved upwardly, naturally moving the stem 30 upwardly and tripping the trip mechanism, allowing the springs 28 and the pressure of the fluid to close the valve 17.

It is seen that at its upper end the stem 30 is provided with a removable cap 35 interposed between which and the stem 30 is a washer 36. By changing the thickness of this washer, the spacing between the disks 31 and 32 may be varied so that the pendulum may swing a certain amount without releasing the trip mechanism. By this means, only shocks of a predetermined violence will actuate the apparatus, and minor shocks will have no effect thereon.

It is seen from Fig. 2 that when the pendulum is swung sufficiently to trip the mechanism, the point of connection 25 between the links 23 and 26 moves upwardly, and to reset the trip mechanism or hinge connection of the valve, it is necessary to press the point of connection 25 downwardly into set position. This is accomplished by means of a plunger 37 projecting through the top of the valve body 10 and provided with a spring 38 normally holding it in its uppermost position. The plunger 37 is provided with a valve face 39 to prevent leakage of gas from the valve body 10 during the normal operation of the valve. By depressing the plunger 37, the hinge connection between the valve 17 and the body 10 will be reset to maintain the valve 17 in open position.

In operation of the device, assuming that it is suspended from a pipe line as illustrated and set so that the valve 17 will be open, upon movement of the pendulum an amount greater than a predetermined degree, the disk 32 will move the disk 31 upwardly projecting the stem 30 upwardly and moving the center of the hinge connection upwardly past the axial center line of the valve 17. Immediately the fluid pressure against the valve 17 and the springs 28 will cause the valve 17 to seat, shutting off further flow of fluid through the valve body 10. After it has been ascertained that the pipe line 15 has not been ruptured, the trip mechanism may be reset by merely depressing the plunger 37, moving the center of the hinge connection downwardly into a set position as illustrated in Fig. 1. Upon releasing of the plunger, it will assume its normal position as illustrated.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a device of the character disclosed, the combination of a valve body having inlet and outlet ports, a valve member controlling one of said ports, a spring tending to close said valve, a toggle strut between said valve and said body normally disposed in extended position to maintain the valve in set open position, pendulum means universally mounted on said body, and toggle actuating means associated with said pendulum and said toggle and operative by movement of the body relative to said pendulum means to trip said toggle strut to permit said valve to close.

2. A device as defined in claim 1, in which the toggle actuating means is adjustable to predetermine the degree of relative movement between the body and the pendulum necessary to trip the toggle strut and release the valve.

3. A device as defined in claim 1, in combination with means operable from the exterior of the body to open the valve and reset the toggle strut.

SIDNEY H. HANSEN.